(12) United States Patent
De Cremoux (10) Patent No.: US 7,768,245 B1
(45) Date of Patent: Aug. 3, 2010

(54) EMULATOR CIRCUIT, A CONTROLLER FOR A SWITCHED MODE POWER SUPPLY, AND A SWITCHED MODE POWER SUPPLY

(75) Inventor: Guillaume De Cremoux, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 12/431,199

(22) Filed: Apr. 28, 2009

(51) Int. Cl.
*G05F 1/00* (2006.01)
*G05F 3/16* (2006.01)

(52) U.S. Cl. .................. 323/259; 323/225; 323/290

(58) Field of Classification Search ............. 323/222, 323/225, 259, 301, 282, 284, 285, 288, 290
See application file for complete search history.

(56) References Cited

U.S. PATENT DOCUMENTS

| | | | |
|---|---|---|---|
| 6,166,527 A | 12/2000 | Dwelley et al. ......... 323/222 |
| 7,176,667 B2 * | 2/2007 | Chen et al. ............. 323/282 |
| 7,518,346 B2 * | 4/2009 | Prexl et al. ............. 323/222 |
| 2008/0001587 A1 * | 1/2008 | Cremoux ................ 323/282 |
| 2010/0027298 A1 * | 2/2010 | Cohen .................. 363/21.14 |

* cited by examiner

*Primary Examiner*—Adolf Berhane
*Assistant Examiner*—Emily Pham
(74) *Attorney, Agent, or Firm*—Koppel, Patrick, Heybl & Dawson (57) ABSTRACT

An emulator circuit for forming a signal representative of current flow in an inductor of a switched mode power supply, where the inductor is associated with a switching arrangement operational to connect a first node of the inductor to a first voltage ($V_{in}$) or to one of a reference voltage ($g_{nd}$) or a current flow path, a second node of the inductor to a second voltage ($V_{out}$) or to one of a second reference voltage ($g_{nd}$) or the current flow path, and wherein the emulator circuit forms a emulator output signal representing the integral with respect to time for which the first and second node of the inductor are connected to the first voltage and the second voltage respectively.

13 Claims, 11 Drawing Sheets

EMULATOR CIRCUIT, A CONTROLLER FOR A SWITCHED MODE POWER SUPPLY, AND A SWITCHED MODE POWER SUPPLY

FIELD OF THE INVENTION

The present invention relates to an emulator circuit for emulating current flow in an inductor of a switched mode power supply, to a controller for a switched mode power supply including such an emulator, and to a switched mode power supply controlled by the controller

BACKGROUND OF THE INVENTION

It is well known that DC to DC converters can be made to step down, that is BUCK, or step up, that is BOOST, a DC input voltage to a different DC output voltage. The DC to DC converter may comprise an inductor in association with two or more transistors such that the current in the inductor can be built up such that energy is stored in it by virtue of its magnetic field, and then that energy can be discharged from the inductor in order to charge a storage capacitor at the output of the DC to DC converter.

Where a DC to DC converter operates with, for example, a battery as the input voltage source then the battery voltage may change as the battery discharges. Thus a converter may initially be required to BUCK the input voltage, but as the battery discharges it may move into a BOOST mode. It follows that at some time the input voltage may be close to the output voltage. This regime can be difficult to control.

It should be noted that such inductor based DC to DC converters inherently require a ripple current to occur in the inductor otherwise the converter loses its ability to regulate its output voltage in response to changes of load current. It becomes important to be able to control this ripple.

SUMMARY OF THE INVENTION

According to a first aspect of the present invention there is provided an emulator circuit for forming a signal representative of current flow in an inductor of a switch mode power supply, where the inductor is associated with a switching arrangement operational to connect:
a first node of the inductor to a first voltage or to a reference voltage or a current flow path,
a second node of the inductor to a second voltage or to the second reference voltage or the current flow path;
and wherein the emulator circuit forms a emulator output signal representing the integral of voltage with respect to time of the voltage difference across the inductor.

It is thus possible to provide a emulator which enables a running estimate of the current (or at least the AC current) in the inductor to be kept in real time. This avoids introducing uncertainty into a control system as a result of noise when measuring the instantaneous current in the inductor. It also avoids the integration effect (or delay if you like) resulting from forming a filtered version of the measured current. Such delays can introduce instability into the control loop, especially when taking into account that the output voltage of the switched mode regulator (or DC to DC converter) has already been integrated onto the output storage capacitor of the power supply (or DC to DC converter).

The invention functions to provide a stable output voltage from a varying input voltage. Thus the invention can be considered as being a power supply, a regulator or a DC-DC converter, and these terms will be used interchangeably.

Preferably the second reference voltage is a local ground. This also acts as the current flow path.

Measuring the current in the inductor is not trivial. Typically the voltage dropped across a semiconductor switch (for example a switch connecting the first node of the inductor to the first voltage) is measured. Assumptions are made about the on resistance of the switch, and hence the current can be deduced from this voltage drop.

However, in practice, the semiconductor switch is often a power FET and a lot of noise and voltage bounce is created when the transistor is switched. For increased reliability it is common to leave a delay of 50 ns or greater before attempting to measure the current flowing through the transistor. In practice this means that the control strategy must wait at least 50 ns before trying to control the switching ON time, so this gives rise to a minimum ON duration of 50 ns which presently limits the frequency of the control cycle.

With the use of the emulator it becomes possible to modify the control loop of the switched mode DC to DC converter such that, when considering its transfer characteristic, it becomes possible to compensate a 0 Hz (zero hertz) pole in the transfer characteristic resulting from the inductor with a 0 Hz zero that is created within the control loop. This provides a stable control system.

According to a second aspect of the present invention there is provided a controller for a switched mode power supply, the controller comprising an emulator circuit according to the first aspect of the present invention, and further comprising a comparator or a difference amplifier for forming a first switch control signal as a function of the emulator output signal and a voltage error signal representing a difference between the second voltage and a target voltage.

It is thus possible to provide an improved controller for a switched mode DC to DC converter.

According to a third aspect of the present invention there is provided a DC to DC converter comprising an emulator as according to the first aspect of the present invention.

BRIEF DESCRIPTION OF THE DRAWINGS

The present invention will further be described, by way of example only, with reference to the accompanying drawings, in which.

DESCRIPTION OF PREFERRED EMBODIMENTS OF THE INVENTION

Figure 1:
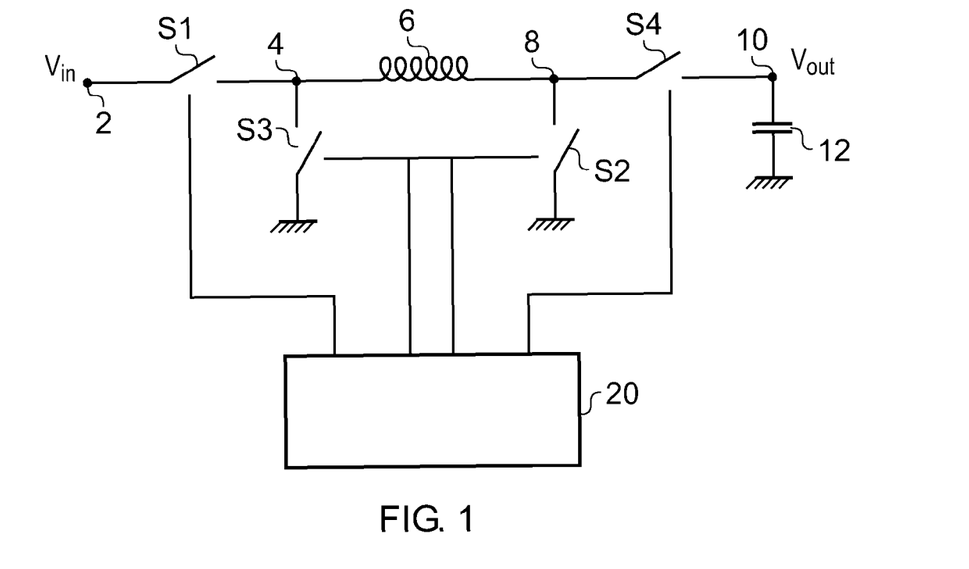
FIG. 1 schematically illustrates a DC to DC converter.

A DC to DC voltage converter operable to increase, i.e. BOOST, an input voltage Vin or to reduce, i.e. BUCK, an input voltage Vin is shown in FIG. 1.

The converter comprises an input node 2 which is connected to a first terminal 4 of an inductor 6 via a first electrically controlled switch S1. A second switch S2 extends between a second terminal 8 of the inductor 6 and ground. A third electrically controlled switch S3 extends between the first terminal 4 of the inductor 6 and a local ground. A fourth switch S4 extends between the second terminal 8 of the inductor 6 and an output node 10. A filtering capacitor 12 is connected between the output node 10 and ground. The switches S3 and S4 provide commutation paths and act as active rectifiers. They can be replaced by diodes if desired, and it is advantageous to have diodes placed in parallel with S3 and S4. In practice the may be several "local grounds", which may be used to separate noisy parts of the circuit (and components driven by it) from less noisy parts of the circuit.

The switches are driven by a controller 20 which provides control signals to the switches.

The basic operation of the converter circuit is well known, but will be briefly described for completeness.

Buck Converter Mode

In this mode Vin is greater than Vout. The controller acts to generate a desired output voltage Vout from the input voltage Vin. This can be achieved by selectively controlling the states of switches S1 and S3. In this mode S2 is kept permanently open (high impedance) and S4 is kept closed (low impedance).

Switches S1 and S3 are driven in anti-phase. This ensures that both switches are not simultaneously conducting which would cause the input voltage Vin to short circuit to ground.

In a first phase, which can be regarded as a magnetisation phase, S1 is closed and S3 is open. Therefore the voltage across the coil, Vcoil, is $$V\text{coil}=V\text{in}-V\text{out} \qquad \text{Equation 1}$$

and the rate of change of current, and more particularly of current build up is given from $$\frac{dI}{dt} = \frac{(Vin - Vout)}{L} \qquad \text{Equation 2}$$

Figure 2:
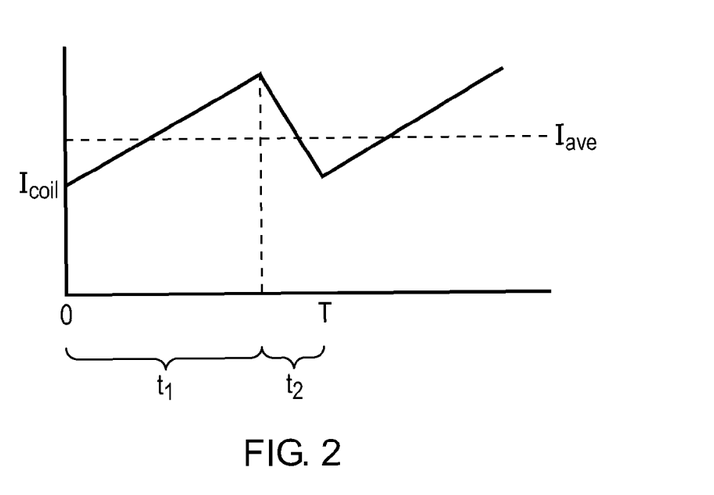
FIG. 2 shows the evolution of inductor current as a function of time for the circuit of FIG. 1 when operating to BUCK (reduce) an input voltage to a lower value.

This current flows for a first time period $t_1$ as shown in FIG. 2, towards the output node 10 where some of the current is supplied a load and some of the current changes the capacitor 12 such that a small increase occurs in the voltage Vout across the capacitor.

The controller 20 monitors the output voltage Vout and the regulation loop within the controller causes switch S1 to open and switch S3 to close.

This causes the voltage across the inductor to become $$V\text{coil}=0-V\text{out}=-V\text{out}. \qquad \text{Equation 3}$$

Consequently the rate of change of current flow in the inductor 6 becomes $$\frac{dI}{dt} = \frac{-Vout}{L} \qquad \text{Equation 4}$$

Thus, in a second period the current flow in the coil 6 starts to decrease, as shown in period t2. Meanwhile current is being drawn from the load so the voltage Vout may fall a little. This process, which can be regarded as a switching cycle or a control cycle, is repeated by the controller, typically at a repetition rate of 500,000 to 3,000,000 times per second. This provides very fine control of the input voltage and the voltage ripple thereon.

It can be seen in FIG. 2 that the instantaneous current varies around an average value $I_{ave}$ which represents the average current being drawn by the load—and assumed for simplicity to be constant over the two switching cycles shown in FIG. 2.

Boost Mode

When it is desired to make Vout greater than Vin, then the circuit can be operated in a BOOST mode.

In this mode switch S1 is left closed (low impedance) and S3 is left open (high impedance). Switches S2 and S4 are operated in anti-phase.

Figure 3:
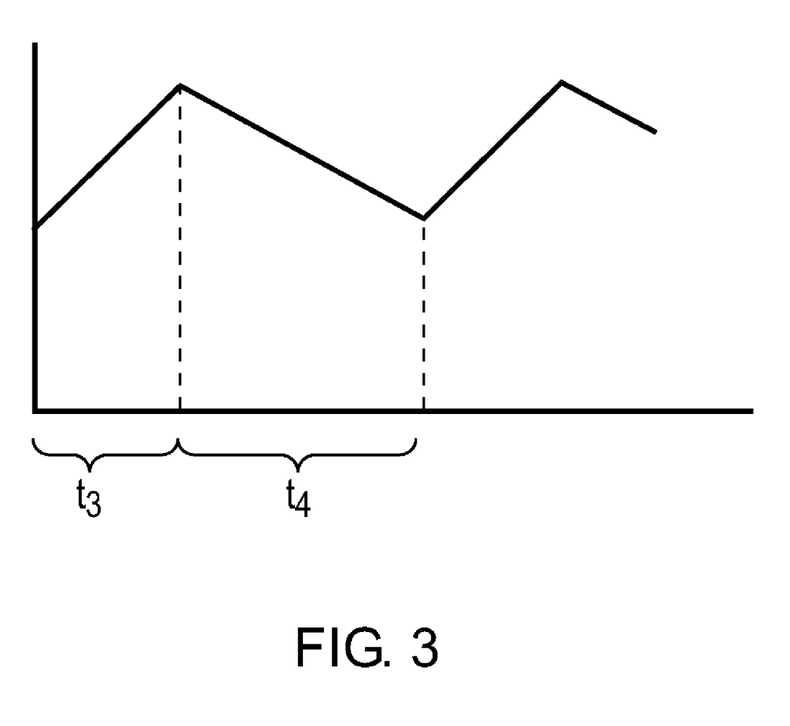
FIG. 3 shows the evolution of inductor current as a function of time for the circuit of FIG. 1 when operating to BOOST the input voltage to a higher output voltage.

During a magnetisation phase S4 is opened and S2 is closed. Therefore the voltage across the coil is given by $$V\text{coil}=V\text{in}-0=V\text{in} \qquad \text{Equation 5}$$

and consequently the rate of change of current in the coil is given by $$\frac{dI}{dt} = \frac{Vin}{L} \qquad \text{Equation 6}$$

so the current builds relatively rapidly. After a time period $t_3$, shown in FIG. 3, the controller 20 opens switch S2 and simultaneously closes switch S4.

Current from the coil now flows towards the load and into the output capacitor 12, thereby charging it, as the magnetic flux around the coil collapses.

During this phase the voltage across the coil is $$V\text{coil}=V\text{in}-V\text{out} \qquad \text{Equation 7}$$

and $$\frac{dI}{dt} = \frac{-Vin + Vout}{L} \qquad \text{Equation 8}$$

This can be considered as a demagnetisation phase, and is designated $t_4$ in FIG. 3.

Without going into rigorous analysis, it can be shown that if a duty cycle D represents the proportion of the time that switch S1 is conducting then, for the BUCK converter $$Vout=Vin \cdot D \qquad \text{Equation 9}$$

If the duty cycle represents the proportion of time that the switch S2 is conducting, then for the BOOST converter $$Vout = \frac{Vin}{1-D} \qquad \text{Equation 10}$$

These BUCK and BOOST converters work very well when the difference between Vin and Vout is relatively large.

The operation of the controller 20 can be quite simple if the converter is always going to be in BUCK mode or always going to be in BOOST mode.

Figure 4:
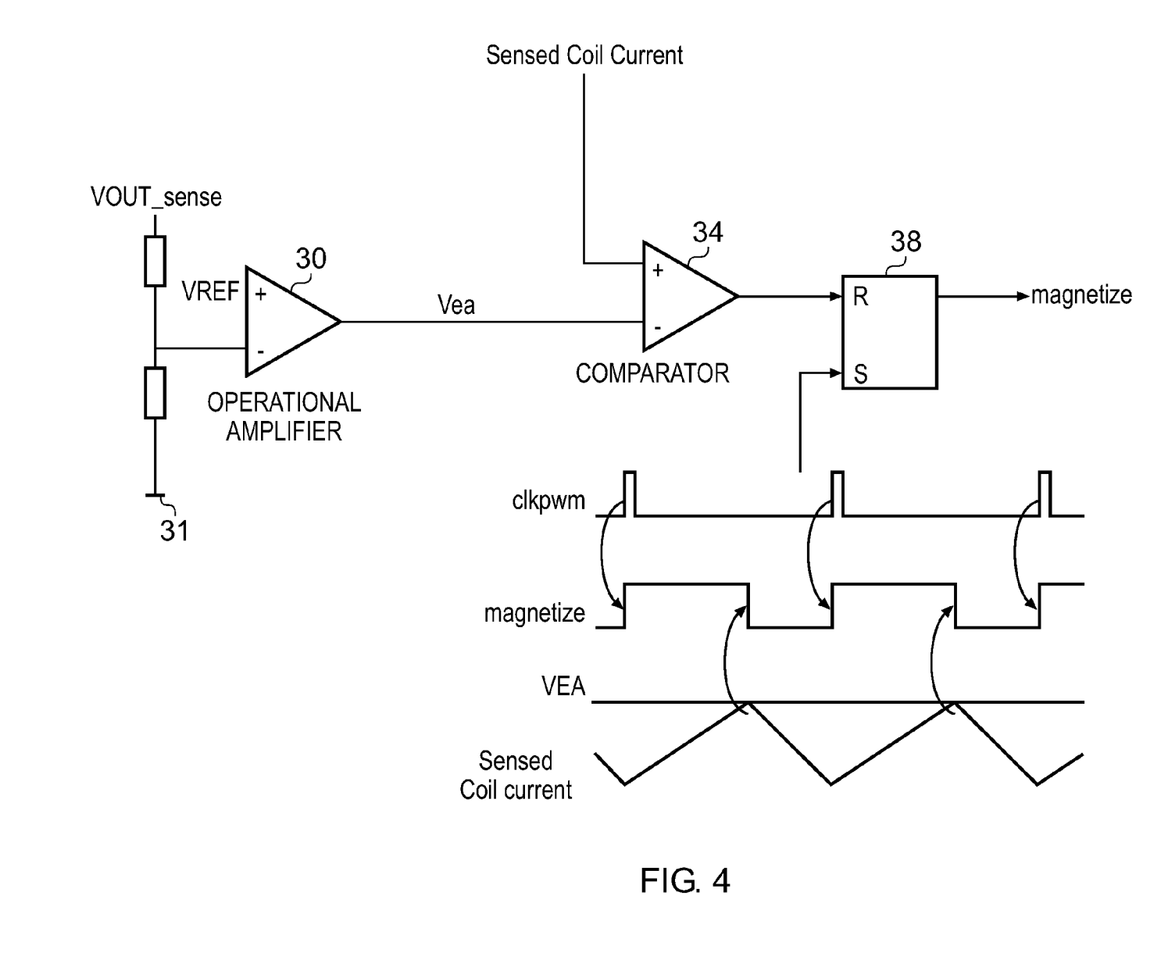
FIG. 4 shows a controller suitable for use in BOOST or BUCK operation.

Such a controller for use in a Boost mode is shown, for completeness, in FIG. 4 (the person skilled in the art will appreciate that with only minor modification the controller can be used in BUCK mode). Such a controller comprises voltage error amplifier 30 which receives the output voltage (optionally via a resistive attenuator 31 as shown) at one input of the amplifier with a reference voltage supplied to the other input of the amplifier. In this example the reference voltage is provided to the non-inverting input, but the person skilled in the art could design equivalent circuits where this was not the case. The amplifier 30 forms an output Vea which is a function of the difference between the output voltage an the reference voltage, as modified by a gain $G_1$ of the amplifier 30.

The output of the amplifier 30 is supplied to an input of a comparator 34. A further input of the comparator is provided with a signal from a current sensing circuit that senses the current in the inductor coil. This could be done by, for example a hall effect sensor, but is often performed by measuring the voltage dropped across an ohmic impedance in series with the inductor coil, or by measuring the voltage dropped across transistor S1. The output of the comparator 34 is provided to a reset input of a set-reset latch 38.

An output of the set-reset latch 38 forms the "magnetise" signal used to control S1 to cause current to be built in the inductor.

A clock signal (i.e. a periodic signal) from a clock circuit (not shown, but known to the person skilled in the art) initiates the start of each control cycle within the controller 20. The clock circuit generates a short pulse "clkpwm" at periodic intervals and which is provided to the set input of the set-reset latch 38. This causes the signal "magnetise" to be asserted, an hence the transistor switch S1 becomes conducting so that current starts to build.

The sensed coil current is compared with the voltage error signal Vea by comparator 34, and once the sensed current (as converted to a voltage) exceeds Vea then the comparator output is asserted, and this resets the set-reset latch causing the "magnetise" signal to be reset, and current in the inductor to decrease.

It can be seen that this circuit, whilst simple, is responsive to the output voltage which is integrated by capacitor 12, and is also responsive to an instantaneous measurement of inductor current, which is likely to be affected by noise.

However their operation of the converter can become compromised when the difference between Vout and Vin starts to fall.

This can be seen because each converter relies on there being a change in the current flowing through the coil during the control cycle. But if Vin and Vout are nearly equal then the rate of increase of current in the magnetisation phase of the BUCK converter $$\frac{dI}{dt} = \frac{(Vin - Vout)}{L} \qquad \text{Equation 11}$$

and the rate of decrease in the demagnetisation phase of the BOOST converter $$\frac{dI}{dt} = \frac{Vout - Vin}{L} \qquad \text{Equation 12}$$

both tend to zero.

A way to overcome the problem of $V_{in}$ being similar to $V_{out}$ is to deliberately induce a current ripple. This is done in a "buck-boost" window where switches S1 and S2 are made conducing in each control cycle.

In such a traditional regime each control cycle has several phases.

Figure 5:
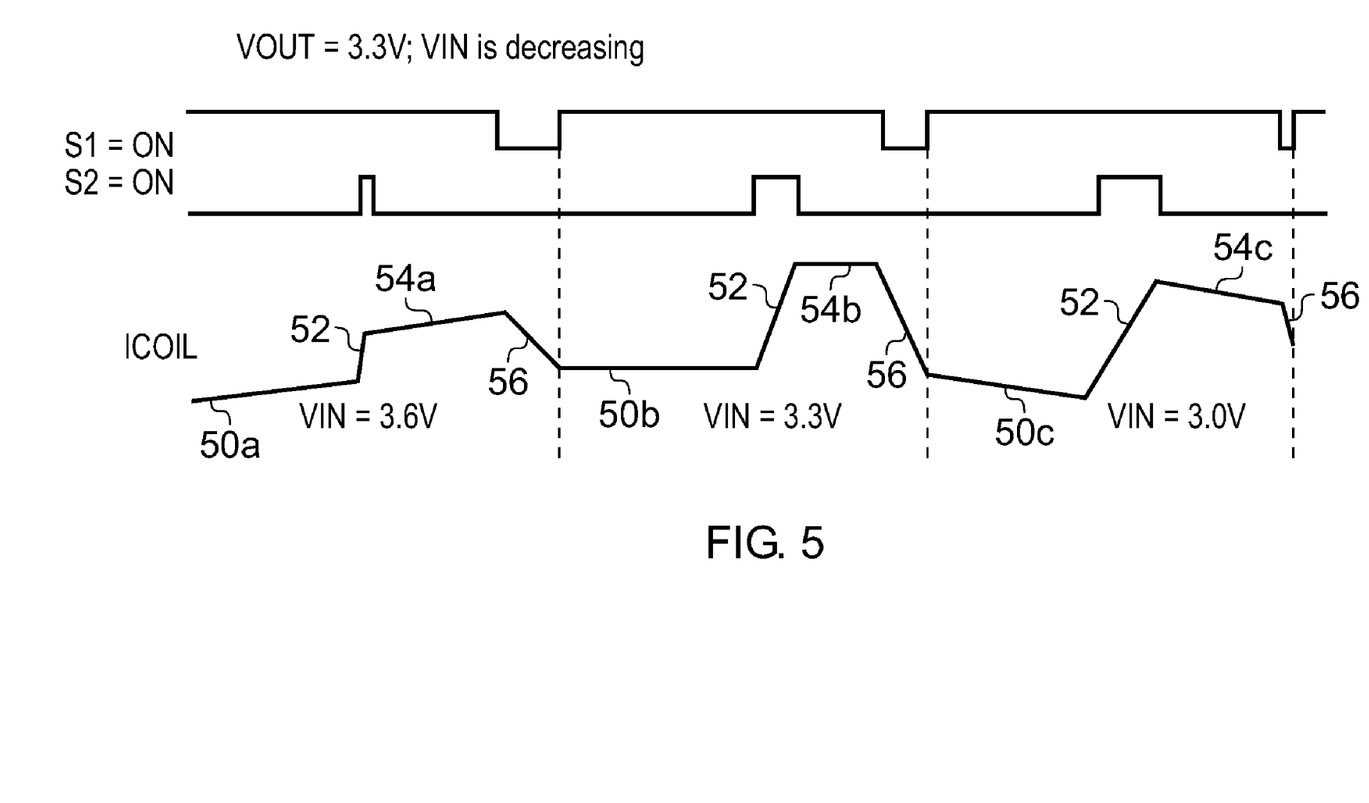
FIG. 5 shows exemplary switch control signals as an input voltage drops.

FIG. 5 shows the switching events in a converter operating in a BUCK-BOOST mode as the input voltage drops from 3.6 V to 3.3 V and then to 3 V, whilst $V_{out}$ is 3.3 V.

It can be seen that each of the cycles has a slow current change region 50a to 50c. Here switch S3 is not conducting, S1 is conducting, switch S4 is conducting and S2 is not conducting. Thus the voltage across the inductor is $V_{in}$–$V_{out}$. Consequently at 50a the current builds slowly, at 50b there is no change in current and at 50c the current actually reduces slowly.

Each cycle also has a period 52 of fast current build when S1 and S2 are both conducting, and S3 and S4 are off. Once the current has built to a sufficient level as determined by the controller 20 then, S2 is opened again (made non-conducting) giving rise to slow current change in regions 54a to 54c.

Finally a discharge phase occurs when S1 is off and S2 is off, so S3 and S4 are on, as indicated by region 56.

Because the controller 20 is responsive to the measured coil current and the output voltage, then the duration for which S1 is off and for which S2 is on varies. Thus when $V_{in}$ is greater than $V_{out}$ the time for which switch S2 is on is short (and ultimately is zero for pure BUCK operation). As $V_{in}$ transitions from a bit above $V_{out}$ to a bit less than $V_{out}$ it can be observed that the off time for S1 decreases and the on time for S2 increases.

If the input voltage falls further then switch S1 becomes permanently on and we enter pure BOOST operation.

However it is necessary to control the relative timing and duration that the switches are on if excessive currents are not to flow in the inductor or regulation is not to be lost. Control strategies divide into 1) voltage mode control 2) current mode control An example of a current mode is described in U.S. Pat. No. 6,166,527. In simple terms a voltage error VCL is compared with two triangle waves, synchronised in time but offset in voltage, to determine when the switches should be switched within a control cycle.

However, those skilled in the art of control theory will note that when constructing the transfer characteristic of this system the inductor current IL obeys the relation $$V = L \cdot \frac{dI_L}{dt}$$

and hence IL is the integral of the switching voltage applied to the inductor. So the inductor is, in transfer characteristic terms, an 0 Hz pole (an integrator).

Furthermore the output capacitor obeys the relation $$I_{(t)} = C \cdot \frac{dV_{(out)}}{dt}$$

Thus the output voltage is an integral of current with respect to time, or a second 0 Hz pole.

In control terms having two 0 Hz poles is undesirable as it can give rise to control loop instability and consequently more complicated compensation schemes to restore stability.

An example of current mode control is given in U.S. Ser. No. 12/001,700. Here a measurement of the coil current is made. The peak coil current is measured and converted to a sensing voltage $V_{cur}$. This is then compared with the voltage error signal. This approach removes one of the 0 Hz poles.

However measuring the current is not trivial. Often the inductor current IL is extracted by measuring the voltage dropped across the first switch S1, which is typically a FET.

This requires the FET to be conducting, and any voltage bounce/ripple to have died away. This typically requires a measurement guard time to be introduced.

Thus, current measurement problems are introduced, but control loop stability is improved.

There are however, further undesirable real world component effects that need to be accounted for, and which can introduce time delays into the control loop, and hence further compromise operation
1) the comparators do not switch instantly, and may exhibit significant delays.
2) The time to turn the switches on and off vary with temperature and can run into 10's of nanoseconds.

Approaches for dealing with these effects will briefly be discussed later.

Figure 6:
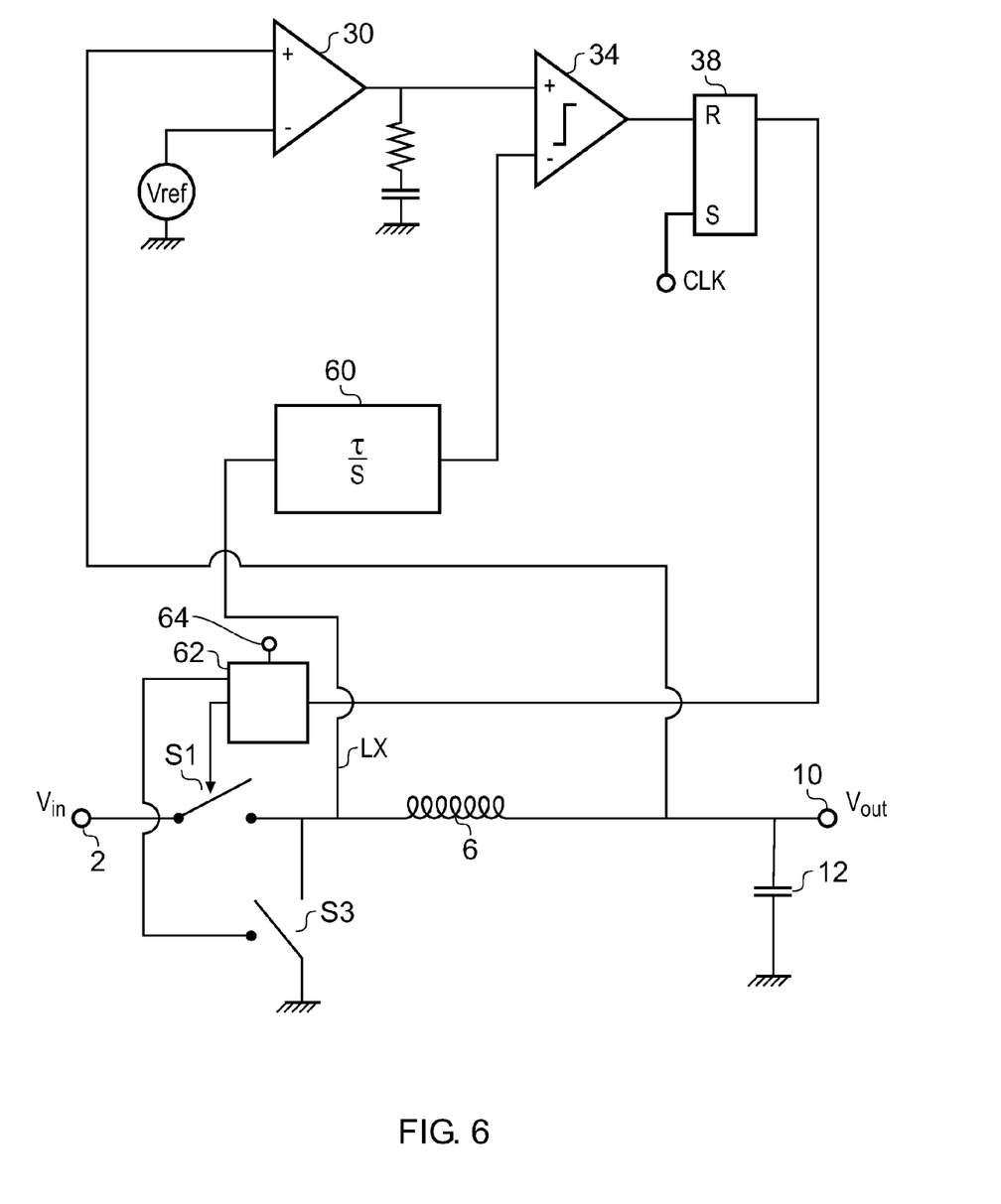
FIG. 6 shows a controller and DC to DC BUCK converter constituting an embodiment of the invention.

FIG. 6 shows an embodiment of a controller for a switched mode DC to DC BUCK converter constituting an embodiment of the present invention.

Like the controller described with respect of FIG. 4, the controller comprises an error amplifier 30 which receives the output voltage at one input thereof and a target voltage at another input thereof, and forms a signed difference between them such that the magnitude and direction of a voltage error is output by the error amplifier.

The output of the amplifier is optionally low pass filtered so as to remove some noise from the voltage error signal. The filtered voltage error signal is supplied to the non-inverting input of a comparator 34 (or to an amplifier having gain G).

An output of the comparator 34 is provided to the reset input of a set-reset latch 38. A set input of the set-reset latch is connected to receive a clock signal. An output of the latch is used to control a first switch S1 arranged to selectively connect or disconnect the first node of the inductor 6 to and from the input voltage $Y_{in}$.

In more sophisticated implementations the output of the set-reset latch is used, as shown here, as an input to a switch control state machine 62 that controls an active rectifier (another switch) extending between the first node of the inductor and ground so as to ensure that no short circuit path exists between Vin and ground via the electronic switches. The state machine may set one or more flags, as represented by output 64, to indicate the state of each of the switches S1 and S3

An emulator 60 receives as its input a signal LX representing the voltage at the first node of the inductor. In fact the signal LX can be regarded as providing information about the supply voltage and the state of the switches. The signal LX can, as shown, be measured at the first node of the inductor, or it can be inferred from knowledge of the supply voltage Vin and knowledge of the state of the first switch S1 (as indicated by output 64) associated with the first node of the inductor and which, in conjunction with switch S3, controls whether the first node of the inductor is connected to $V_{in}$ (e.g. the first voltage) or to ground (the reference voltage). Indeed, if the supply voltage is quite stable then the emulator 60 could be solely responsive to the output 64 of the switch control state machine 62.

The emulator 60 integrates this voltage at the first node (and as will be seen later actually integrates the voltage difference across the inductor) to arrive at an estimate of the instantaneous inductor current.

The estimate of the instantaneous AC component of inductor current output from the emulator is provided to the inverting input of the comparator 34 or amplifier.

The emulator 60, by forming an idealised estimate of the instantaneous AC current component in the inductor, removes the noise associated with trying to form an instantaneous measurement.

The emulator 60 can also change the transfer function of the control loop.

The emulator can be fabricated in many ways, and can be fabricated so as to work in the analog domain or the digital domain—for example as an up/down counter.

In the context of a controller for a switched mode DC to DC converter where the clock frequency of the controller can be from 500 KH$_z$ up to several MHz, then an analog implementation is suitable.

Figure 7:
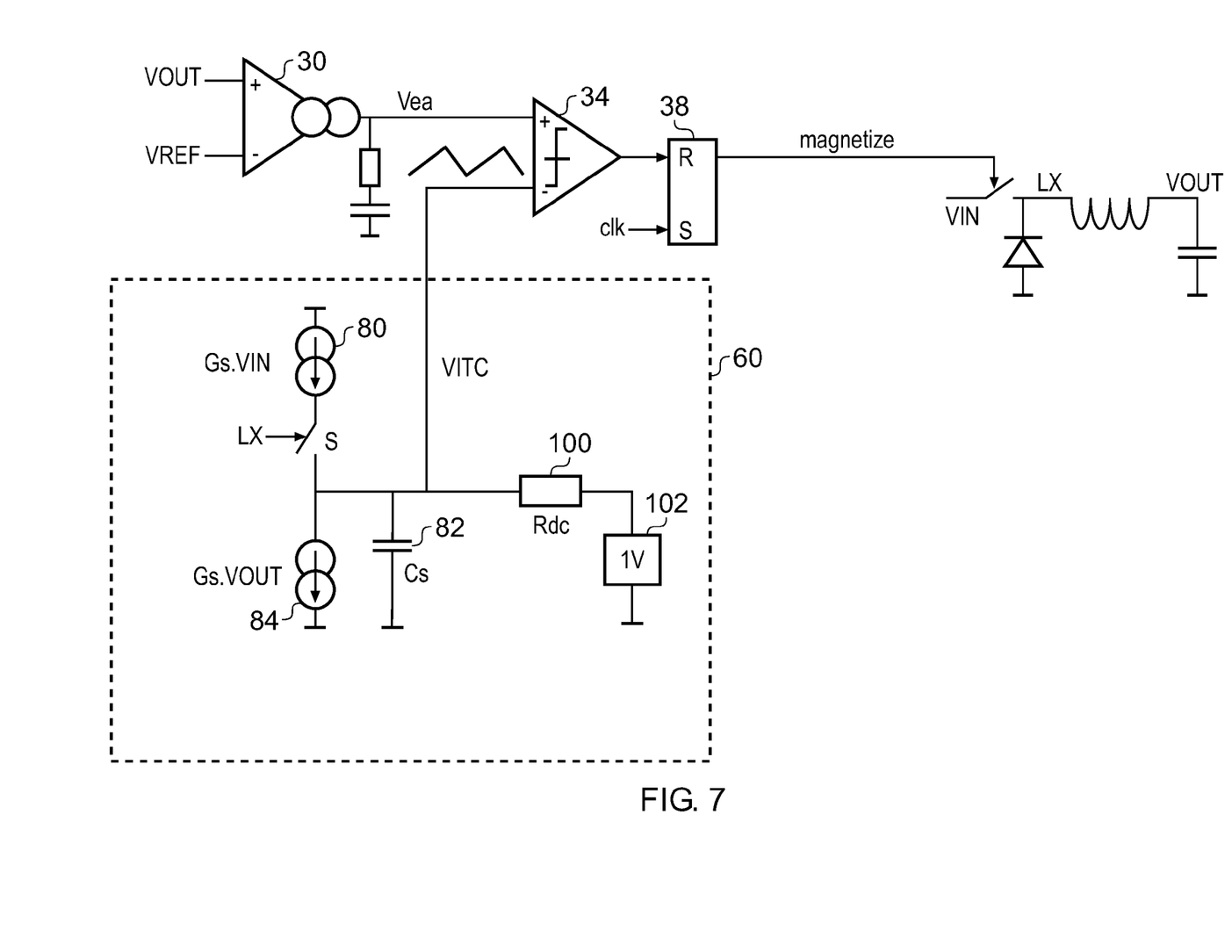
FIG. 7 shows the circuit of FIG. 6 in greater detail.

FIG. 7 shows the circuit of FIG. 6 in greater detail. In particular the components internal to the emulator 60 are shown in detail.

The emulator 60 comprises a current source which generates a current $I_{charge}$ proportional to the input voltage $V_{in}$ $$I_{charge} = G_S \cdot V_{in}$$

where $G_s$ represents a transconductance term.

The current $I_{charge}$ is selectively supplied to a capacitor 82 when the signal LX (FIG. 6) indicates that switch S1 has closed.

When S1 is closed, the rate of current charge in the inductor is $$\frac{dI}{dT} = \frac{(V_{in} - V_{out})}{L}$$

The current source 80 models the term $$\frac{V_{in}}{L}.$$

To model the term $$\frac{-V_{out}}{L}$$

a current sink 84 is provided to pass a current $I_{discharge}$ where $$I_{discharge} = G_S \cdot V_{out}$$

When switch S1 is open (non-conducting) then switch S3 is closed, and the voltage across the inductor 6 is $-V_{out}$. Thus for this period of time the sink 84 needs to pass a current $$I_{discharge} = G_S \cdot V_{out}$$

Thus the current sink 84 can, in this implementation, be permanently connected to the capacitor 82. The capacitor 82 acts to integrate the current flow to and/or from the current sink and source and hence the voltage across the capacitor is an instantaneous representation of the current in the inductor 6.

Figure 8:
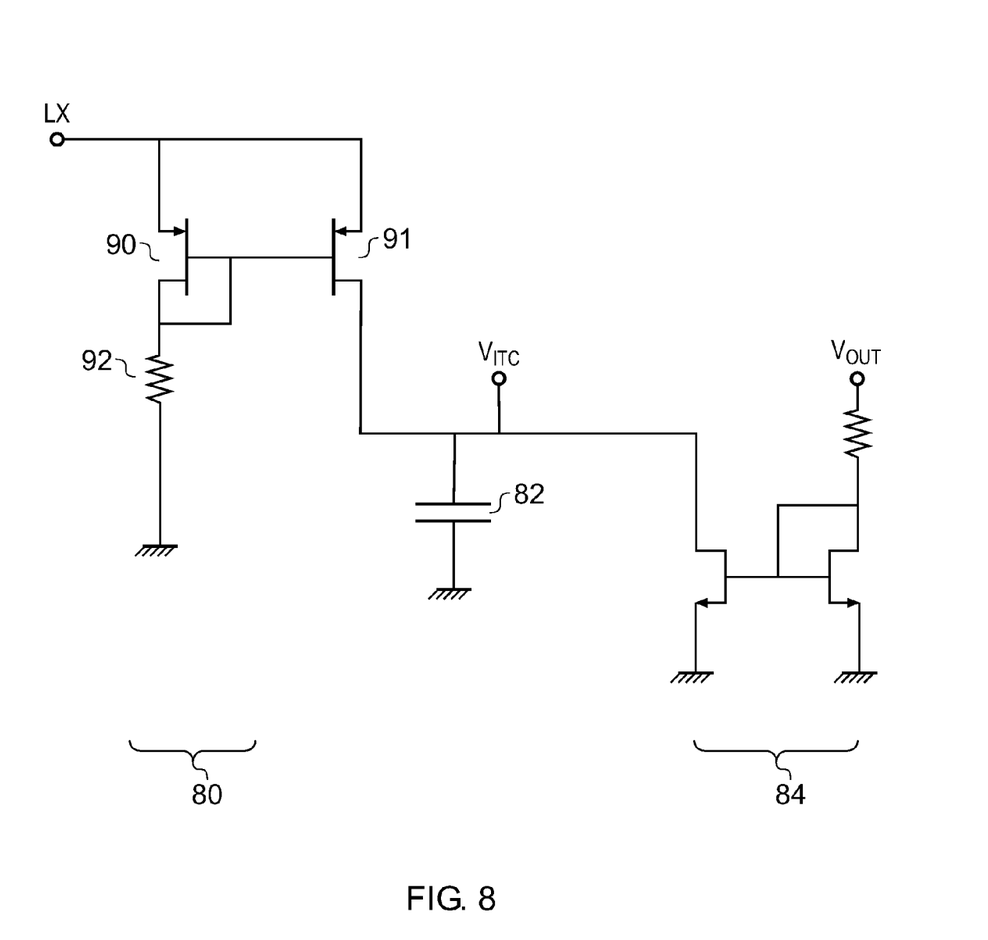
FIG. 8 shows embodiments of a current source and a current sink for the emulator.

The current source and sink can be made, for example by a current mirrors as shown in FIG. 8. Here the current source 80 is formed by field effect transistors 90 and 91 connected in a current mirror configuration. Transistor 90 is in a diode connected configuration, and the current passing therethrough gives rise to a voltage across resistor 92. This voltage is transferred to the gate of transistor 91 so it passes the same current. By connecting the drains of transistors 90 and 91 to the first node of the inductor the signal LX at that node serves to be representative of the input voltage at the inductor and the state of switch S1.

A similar current mirror pair can be used to provide the discharge current proportional to $V_{out}$.

More complex circuits, for example including operational amplifiers are known to the person skilled in the art and could be used instead.

If we look at the transfer characteristic, the response of the comparator and the set-reset latch can be represented in the Laplace domain as $$d(s) = G \cdot \left( Vea(s) - \frac{d(s)}{s\tau} \right)$$

where Vea is the voltage error signal.

Expanding this we can write the transfer function as $$\frac{d(s)}{Vea(s)} = \frac{s\tau}{1 + \left(s\frac{G}{\tau}\right)}$$

This gives a 0 Hz left half plane zero which directly cancels the pole created by the inductor.

Thus, without the need to directly sense the inductor current, we get a response similar to that of a single pole current-mode control system.

Returning to FIG. 7, it is desirable to constrain the voltage across the capacitor to ensure it always takes sensible values. To this end, a leakage path via resistor 100 to a voltage source 102 is provided, so as to urge the voltage across the capacitor 82 towards the voltage of the voltage source 102. This compensates for drift that might occur in the scaling of the current source and sink or as a result of offset voltages when measuring Vin or Vout.

Figure 9:
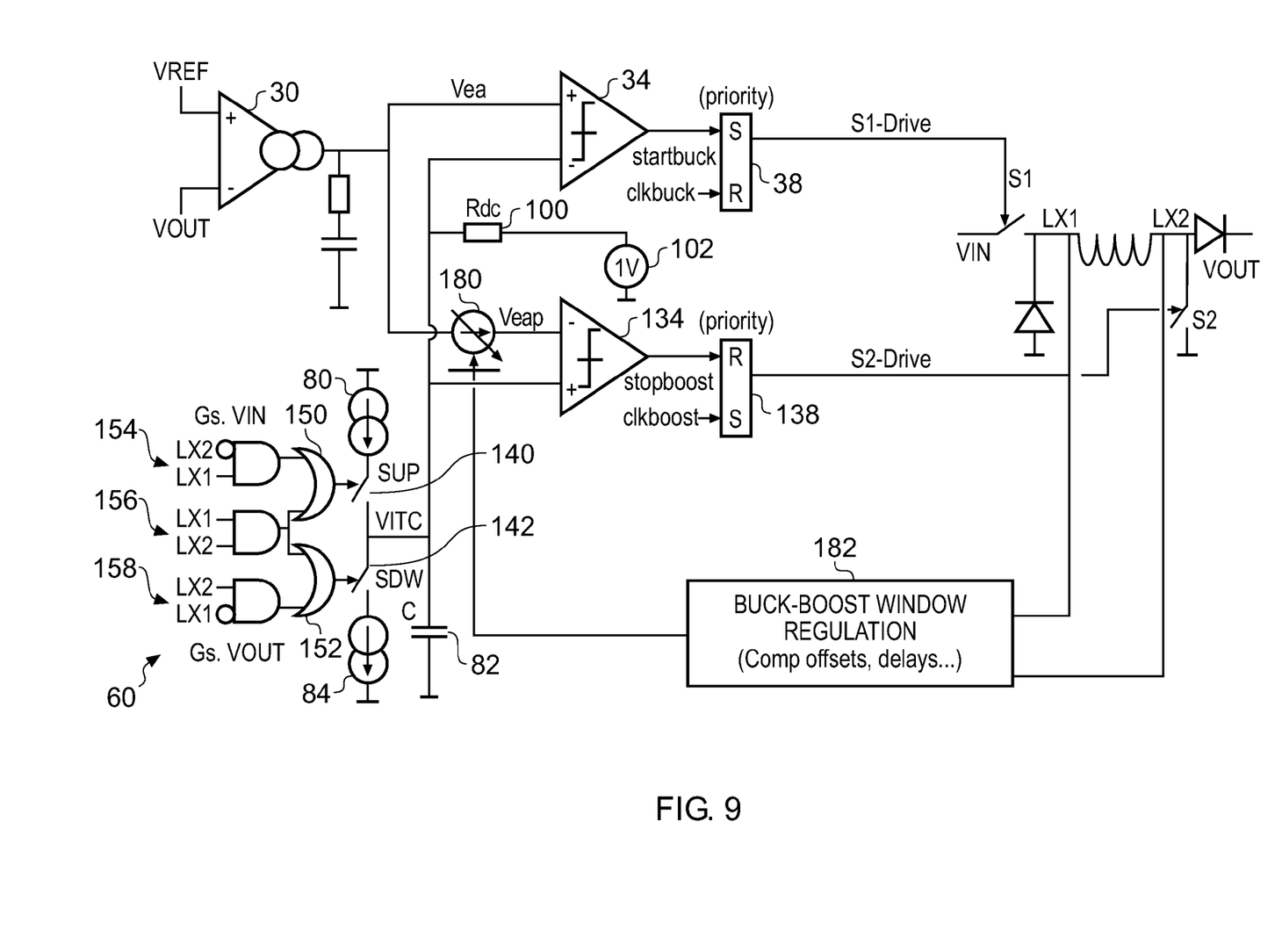
FIG. 9 shows a further controller constituting an embodiment of the invention.

The emulator can also be shared by control loops within a BUCK-BOOST controller, as shown in FIG. 9.

FIG. 9 can be regarded as an extension to the arrangement shown in FIG. 7. To aid understanding like reference numerals will be used for the like parts.

It can be seen that a second comparator 134 analogous to comparator 34 is provided. The second comparator receives the output $V_{ITC}$ representing the instantaneous current in the inductor 6 at one input thereof, and a version of the error voltage Veap, subject to possible offsetting at another input thereof. An output of the comparator 134 is provided to a reset terminal of a set-reset latch 138. An output of the latch is used to drive the second switch S2 and S4 as the compliment of the drive to S2. The set terminal of the latch 138 receives a boost clock signal, "clkboost".

The latch 38 in this example receives a buck clock signal "clkboost". clkbuck and clkboost have the same frequency as each other.

The emulator 60 is slightly modified. The current source 80 and sink 84 are now both selectively connectable to and disconnectable from the capacitor 82, by way of switches 140 and 142, respectively.

Combinational logic in the form of OR gates 150 and 152, and AND gates 154 and 158. Some of the AND gates are preceded by inverters or have inverting inputs. The combinational logic may take other forms.

In this example switch 140 will close if:
S1 is open AND S2 is closed
or
S1 and S2 are both open.

This could be simplified to switch 140 is closed if switch S1 is open.

Switch 142 is closed if
S2 is closed and S1 is open
or
S2 and S1 are both closed.

This can be simplified to switch 142 is closed if switch S2 is closed.

Thus, with this modification, the magnitude and direction of change of current flow within the inductor can be simulated by the current source 80 and the sink 84, and the integrating effect of the inductor can be modelled by the capacitor 82. Consequently the voltage across the capacitor is representative of the current in the inductor.

As with the previously described embodiment, a leakage path via resistor can be provided to urge the voltage to a reference value.

The arrangement of FIG. 9 also includes a variable offset generator 180 responsive to an offset control circuit 182. In this embodiment the offset generator 180 is inserted in the signal path to the inverting input of comparator 134. The skilled person will appreciate that an equivalent offset could be applied in the signal path to the non-inverting input or that current steering within the comparator (which typically has a long tail pair) could be implemented to introduce a bias into the long tail pair so as to give a controllable offset in the comparator's response. Alternatively, as disclosed in U.S. Ser. No. 12/001,700 an offset can be introduced into the signal paths to both comparators.

The offset control circuit may be controlled, for example by monitoring the function of the switches, or by a control word loaded into it, so as to cause the offset generator to apply an offset to the signal at its input.

This offset is used to correct for the effects of delay in the comparator switching times (which may be asymmetric) and the delay in FET turn on time and FET turn off times. These again may be asymmetric in that one is faster than the other.

In use the clock signals "clkbuck" and "clkboost" are at the same frequency, but may be offset in phase with respect of each other.

Figure 10:
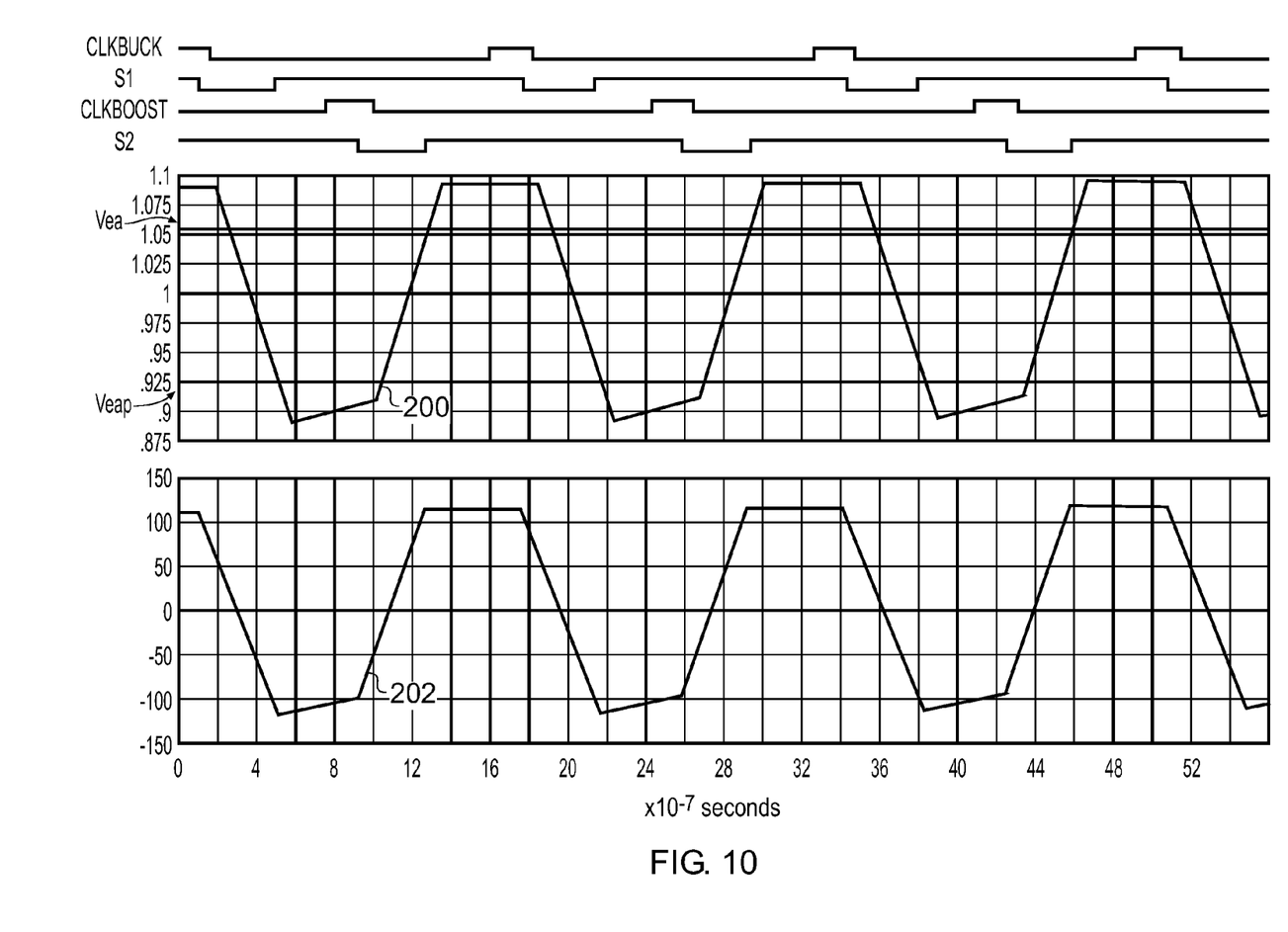
FIG. 10 shows diagrams of emulator output compared to inductor current, and also the relative states of the clock signals CLKBUCK and CLKBOOST, and the switch control signals S1 and S2.

FIG. 10 shows exemplary timing for several waveforms within the circuit of FIG. 9. The timing diagram is from a computer simulation of the circuit of FIG. 9, and it can be seen that the capacitor voltage at the output of the emulator, shown by line 200 has the same shape as the plot of inductor current, shown by line 202.

FIG. 10 also shows the clocks, clkbuck and clkboost, and the switching signals for S1 and S2. The simulation also models the propagation delays in the comparators, set-reset latch 38, and in a state machine 62 (FIG. 6) for controlling the transistor switches to ensure, for example, that S1 and S3 do not conduct simultaneously.

Thus, if we return to FIG. 9, we would expect that asserting "clkboost" would immediately cause S2 to conduct. However, "clkboost" is asserted at about time $t=7.5\times10^{-7}$ s but the current rise in the inductor does not become rapid until about $t=9.5\times10^{-7}$ s, indicating a 200 ns signal propagation delay. Similarly the voltage across the capacitor exceeds Veap at around $t=10.5\times10^{-7}$ s but S2 does not actually open until $t=13\times10^{-7}$ s due to delay in the comparator 134, the latch 138 and the control circuit (i.e. state machine and buffers) for the switch S2. Similar delays occur between "clkbuck" being asserted, thereby instructing switch S1 to be opened (see for example $t=16\times10^{-7}$ s) and S1 actually opening (at $t=17.5\times10^{-7}$ s, and also between the capacitor voltage on capacitor 82 exceeding Vea (at $t=13\times10^{-7}$ s) and S1 closing (at $t=17.5\times10^{-7}$ s).

It can be seen that the size of the offset produced by the offset generator 180 controls the difference between the values of Vea and Veap and hence the overlap range for which both controllers are active to create a buck-boost window. One suitable algorithm for controlling the overlap is disclosed in U.S. Ser. No. 12/001,700 which is incorporated herein by reference. However, by way of a summary the durations of the pulse times for which the voltages at the first and second terminals of the inductor are low are measured. These times are compared with time windows made up of two parts. A first part indicates a time period for which the switch on or off time (as appropriate) is too short. The second mask indicates a time window in which a transition is expected to occur if the controller is operating in the BUCK BOOST mode. The controller examines the pulse timings and charges them in accordance with the following strategy i) for each one of the time periods, measure the duration of the pulse, ii) if both pulses are too short (which includes a missing pulse) increase the duration of both pulses, iii) if both pulses exist, but one of them is too long, then decrease the duration of both pulses;

iv) for all other conditions no alteration to the pulse length is made.

The pulse lengths are adjusted by varying the size of the offset produced by the offset generator 180. The pulse length control algorithm is implemented by the control circuit 182.

The output from the emulator does not need to accurately replicate the value of the current in the inductor, it is sufficient that the evolution of the output signal from the emulator includes the integral effect that affects the inductor current. However, by weighting the current evolution by $V_{in}$ and $V_{out}$, we get a signal that is quite a close replica of the inductor current. This gives matching between the left half plane zero produced by the emulator with the left half plane pole from the inductor, and hence better cancellation of the pole.

With further modification of the emulator the DC level within the emulator can be controlled to provide improved matching to the actual inductor current. Such a modified emulator is shown in FIG. 11.

The current source 80, current sink 84, capacitor 82, and switches 140 and 142 are as described with respect to FIG. 9. However on additional circuit 220 is added to control a DC level on capacitor.

Figure 11:
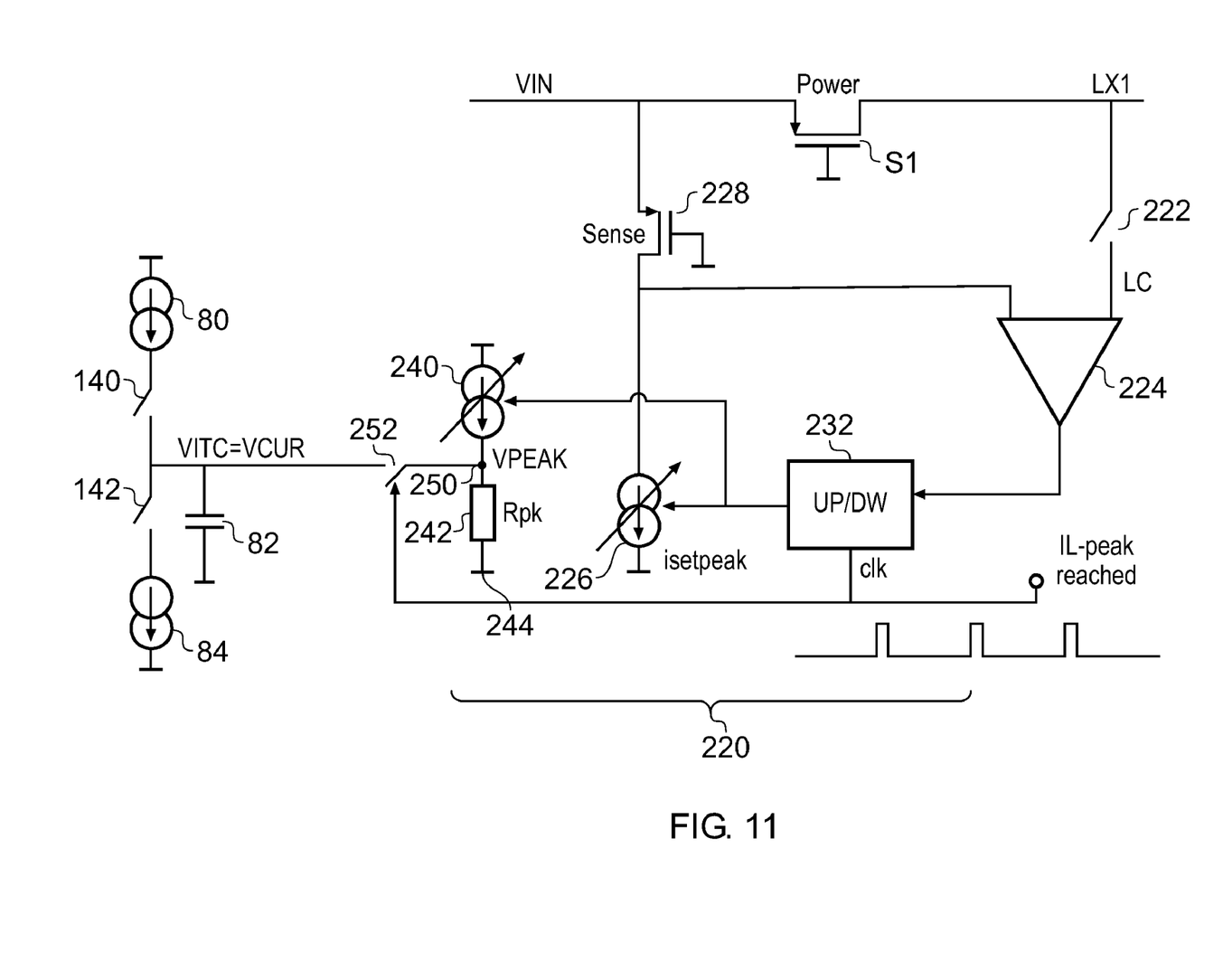
FIG. 11 shows a modified emulator with improved offset and drift correction.

In FIG. 11 S1 is shown as a power FET. When S1 is closed it conducts current, and a small voltage drop occurs across S1 due to its on resistance. Consequently the voltage at node LX1 is slightly less than $V_{in}$. This voltage is supplied via switch 222 to one input of a comparator 224. At the same time a current sink draws a known and controllable current through a sensing transistor 228 which is a scaled version of S1. The voltage drop across transistor 228 is proportional to the current taken by current sink 226. The voltage drop across transistor 228 for a given current flow is proportional to the voltage drop across S1 for the same current flow, and is related to the current in S1 by the relative scaling between the transistors.

The voltage at a node between the transistor 228 and the current sink 226 is provided to a second input of comparator 224. An output of the comparator 224 is provided to a direction control input of an up/down counter 232. The up/down counter counts up or down depending on the state of the output of the comparator, and is incremented or decremented in response to signal "IL peak reached" representing the inductor current reaching a peak, which acts as a clock signal for the counter.

The signal IL peak reached" can be generated each time VITC exceeds Vea.

At each occurrence of "IL peak reached" being asserted the comparator compares the voltage drops across S1 and transistors 228, and depending on the result increments or decrements counter 232. This in turn causes the current through the current sink 226 to increase or decrease.

The output from the up/down counter 232 is also provided as a control signal to a programmable current source 240 in series with a resistor 242. The resistor connects to a local ground 224. Thus the voltage at the node 250 between the current source 240 and resistor 242 is controlled by the counter 232.

It will be appreciated that if the resistor is connected to a regulated supply rail, then the resistor and current source could be swapped, and the controllable current source would become a controllable current sink.

The node 250 can be connected to the output of the capacitor 82 by a transistor switch 252 when, for example, "IL peak reached" is asserted.

In use, the inductor current is compared with the sense current (as suitably scaled by the transistor sizes). If the inductor current is too large, then counter 232 is incremented, so the current in source 240 and sink 226 is increased.

The current in sink 226 is mirrored by source 240 and converted to a voltage $V_{peak}$ to apply DC offset and drift correction to the voltage on the capacitor 82 of the emulator 60. To achieve this correction a switch 252 is provided to periodically connect the capacitor 82 to node 250 for a brief time when the inductor current reaches its maximum value.

As a consequence, after just a few switching and control cycles the value of the current in the current sink 226 is self adjusting and oscillates around a value that describes the inductor peak current. As a consequence both the AC and the DC current components of the inductor current are estimated by the emulator.

"IL peak reached" can be generated by analysis of the emulator output, for example by estimating when the current stops rising, or can be triggered from S2 opening, and thereby inherently stopping the current build up.

It is thus possible to estimate the current at any instant, and to use the estimated current within a control loop for a DC to DC converter, and for other purposes that require knowledge of the inductor current, such as protection circuits to prevent excess current flow.

Figure 12:
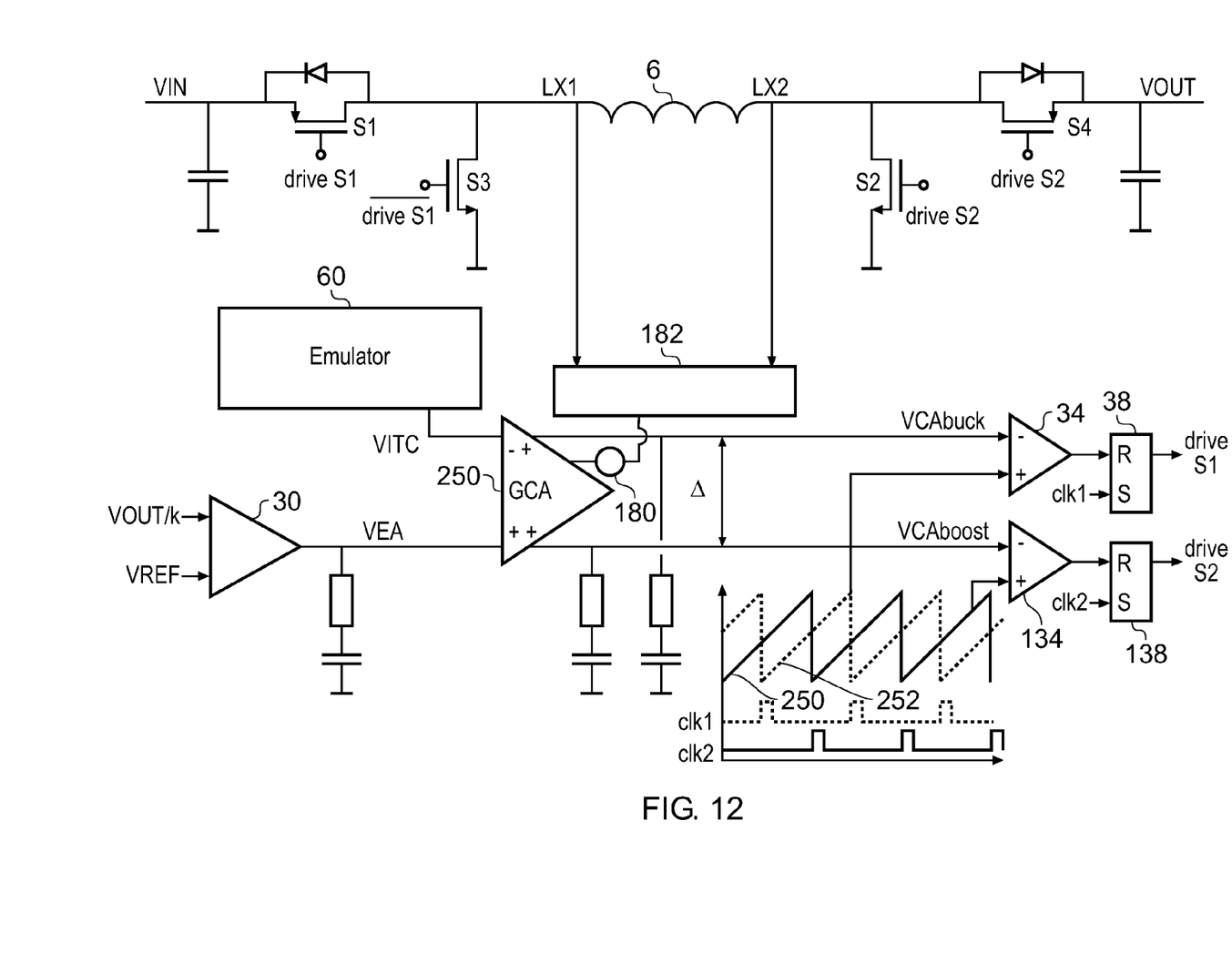
FIG. 12 shows a controller constituting a further embodiment of the invention.

FIG. 12 shows a further embodiment of the present invention which is a variation on the previously described embodiments and, for simplicity, like parts will be referred to with like reference numerals. Thus the emulator 60 is responsive to a switch control state machine (not shown) or to the signals LX1 and LX2 as described hereinbefore. The signals LX1 and LX2 are also provided to a offset control circuit 182 (as described with respect to FIG. 9) which controls an offset generator 180. An output of the offset generator 180 is provided to an error amplifier 250 which forms a difference between the voltage error Vea and the estimate of current as converted to a voltage, VITC and then further modifies this difference by the voltage produced by the offset generator 180 to produce the signals VCABUCK and VCABOOST which are separated from each other by the value of the offset. These signals are provided to comparators 34 and 134 as described herein before with respect to FIG. 9, the comparators 34 and 134 are responsive to sawtooth signals which, in this example, are offset in phase with respect to each other by 180° although in other implementations the designer can choose phase shifts other than 180°. The signal 252 provided to the comparator 34 is synchronised so as to start with the occurrence of the clock 1 signal provided to the set-reset latch 38 (thus clock 1 corresponds to the clkbuck signal of FIG. 9). The second sawtooth signal 250 provided to the comparator 134 is synchronised with the clock 2 signal (which corresponds to clkBOOST of FIG. 9). It can be seen that the output of the comparator changes when the value of the saw tooth signal 252 exceeds the value of VCABUCK.

The magnitudes and voltage range of the saw tooth signals 250 and 252 can be selected by the designer to, for example, be centred about the average voltage output by the amplifier 250.

Although the current sources have been described as varying with $V_{in}$ or $V_{out}$, this is not necessary and for some implementations the current sources and sinks can have a fixed value, or may simply be RC circuits to charge the capacitor.

The invention claimed is:

1. An emulator circuit for forming a signal representative of current flow in an inductor of a switched mode power supply, where the inductor is associated with a switching arrangement operational to connect
a first node of the inductor to a first voltage (Vin) or to one of a first reference voltage and a current flow path, and
a second node of the inductor to a second voltage (Vout) or to one of a second reference voltage and the current flow path,
and wherein the emulator circuit is arranged to integrate the voltage difference across the inductor to form an emulator output signal;
and further including a correction circuit for correcting an emulator output value to match a measured inductor current.

2. An emulator circuit as claimed in claim 1, in which the voltage difference is integrated by charging and discharging of at least one capacitor.

3. An emulator circuit as claimed in claim 1, in which one of a current source and a current sink is arranged to pass a current proportional to the first voltage (Vin), and the current is directed towards a terminal of a capacitor for a time period representing the time that the first node of the inductor is connected to the first voltage.

4. An emulator circuit as claimed in claim 1, in which one of a current source and a current sink is arranged to pass a current proportional to the second voltage (Vout), and the current is arranged to flow to a terminal of a capacitor for a time period representing the time that the second node of the inductor is connected to the second voltage (V out).

5. An emulator circuit as claimed in claim 3, further including the other of the current source and the current sink arranged to pass current or direct current to the capacitor for a time period representing the time that the second terminal of the inductor is connected to the second node.

6. An emulator circuit as claimed in claim 1, in which the emulator output value is matched to a measured peak current value.

7. An emulator circuit as claimed in claim 6, in which the matching occurs during a period when the inductor current is substantially at a peak value during a control cycle.

8. A controller for a switched mode power supply that includes an emulator circuit for forming a signal representative of current flow in an inductor of a switched mode power supply, the controller comprising:
a switching arrangement operational to connect:
a first node of the inductor to a first voltage (Vin) or to one of a first reference voltage and a current flow path, and
a second node of the inductor to a second voltage (Vout) or to one of a second reference voltage and the current flow path,
and wherein the emulator circuit is arranged to integrate the voltage difference across the inductor to form an emulator output signal;
and further comprising a comparator or a difference amplifier for forming a first switch control signal as a function of the emulator output signal and a voltage error signal representing a difference between the second voltage and a target voltage;
wherein the first switch control signal is used to initiate connection of the first node of the inductor to the first voltage, and a first clock signal (clkbuck) is used to inhibit connection of the first node to the first voltage.

9. A controller as claimed in claim 8, further comprising a second difference amplifier or a comparator for forming a second switch control signal as a function of the emulator output signal and the voltage error signal, the second switch control signal being arranged to control the connection between the second node of the inductor and the second voltage or the second reference voltage.

10. A DC to DC converter comprising a controller as claimed in claim 8.

11. A controller as claimed in claim 9, further including means for introducing a controllable offset to one of the first and second comparators.

12. A controller as claimed in claim 9, in which the second switch control signal is used to initiate connection of the second node of the inductor to the second voltage, and a second clock signal (clkboost) is used to inhibit connection of the second node of the inductor to the second voltage.

13. A controller as claimed in claim 11, in which the offset is controlled or adjusted in response to switching delays in the first and second switches or other circuit artefacts or non-linearities.

* * * * *